United States Patent Office 2,767,030
Patented Oct. 16, 1956

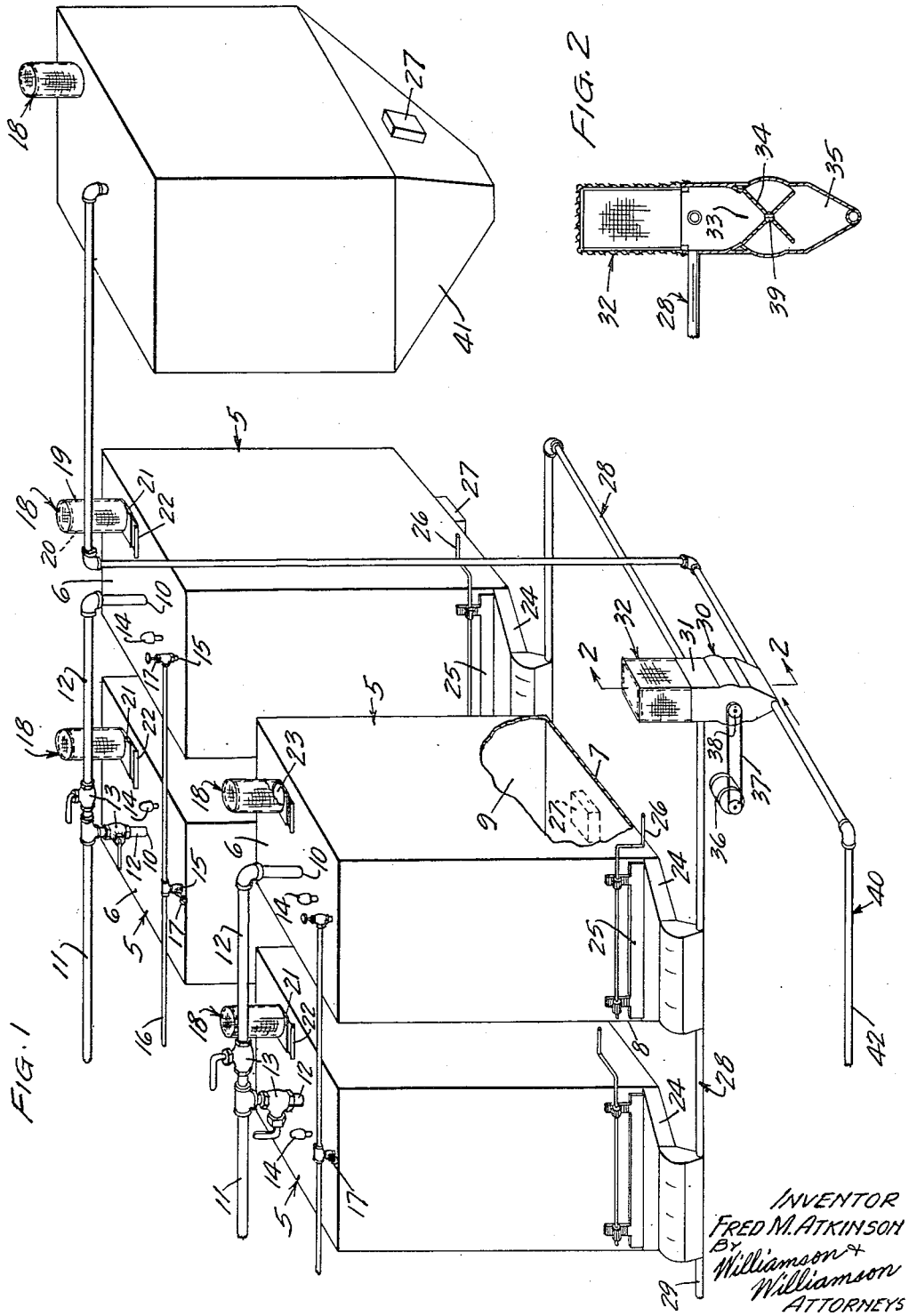

2,767,030

APPARATUS FOR CONVEYING PULVERULENT MATERIAL IN FIXED INSTALLATIONS

Fred M. Atkinson, Minneapolis, Minn., assignor, by mesne assignments, to Atkinson Bulk Transport Company, Minneapolis, Minn., a corporation of Minnesota Application December 21, 1951, Serial No. 262,825

3 Claims. (Cl. 302—17)

This invention relates to apparatus for conveying pulverulent material within fixed installations. More particularly, it relates to apparatus for conveying pulverulent materials within fixed installations such as bakeries and the like wherein a substantial amount of the material is required to be kept in storage and wherein the materials must be conveyed to a central location for weighing, mixing or the like preparatory to its use.

Current practices in bakeries and other establishments wherein pulverulent materials must be stored prior to their use must be moved to a central location for mixing, weighing and the like, generally involve the packaging of the material in bags and other containers, storing the same, and transporting and dumping them at the desired central location as needed. Such practices involve excessive handling of the material, a waste of man hours, wastage of material due to breakage of the container, loss of time, inconveniences, contamination of the material, unnecessary and continuous expense in the way of bags or containers and cost of packaging, and unnecessary fire dangers. My invention is directed toward the substantial reduction or complete elimination of these disadvantages. Some devices have been previously designed for transporting such materials within fixed installations but these devices utilize the principle of pneumatic conveying in contrast to conveying by fluidization and require the use of heavy and expensive equipment.

My invention as disclosed and claimed herein is intended especially for use in conjunction with my portable conveying unit as disclosed and claimed by me in U. S. Letters Patent application, Serial No. 248,955, filed September 29, 1951 and entitled Method and Apparatus for Handling Pulverulent Materials and is a counterpart thereof for use within fixed installations such as bakeries. It could, of course, readily be used in conjunction with any mobile conveying unit for such materials.

A general object of my invention is to provide novel and improved apparatus for conveying pulverulent materials within fixed installations such as bakeries and the like, the apparatus being of cheap and simple construction and operation.

A more specific object is to provide novel and improved apparatus adapted to be fixedly installed within bakeries or similar establishments at low cost and to be operated to convey such pulverulent materials therewithin at increased efficiency and with a minimum of inconvenience and expense.

A still more specific object is to provide novel and improved apparatus for conveying pulverulent materials adapted to be fixedly installed in the usual storage space of the bakery and to operate to eliminate all manual handling of the flour between the point of delivery and the point of use, this being accomplished with a minimum of equipment and expense in the way of installation and operation.

Another object is to provide novel and improved apparatus which will operate to eliminate unnecessary manual handling of the pulverulent materials and hence effect a substantial saving in man hours.

Another object is to provide apparatus of the class described which, by its operation, will eliminate the need for packaging and unpackaging the pulverulent materials for storage and hence save the cost of the package as well as the labor involved in these operations, this being accomplished with a minimum of equipment.

Another object is to produce apparatus of the class described which will require a minimum of equipment and yet substantially reduce the amount of time required for conveying the pulverulent material from its point of storage to its point of use and to substantially eliminate the man hours normally required for such conveyance.

Another object is to provide novel and improved apparatus for conveying pulverulent materials within fixed installations which will operate to eliminate the wastage normally attendant with the handling of such packaged material due to the breakage of the package, etc.

Another object is to provide novel and improved apparatus for conveying pulverulent material within fixed installations which will reduce the contamination of the pulverulent material such as flour and hence improve the resulting product produced therefrom.

Another object is to reduce fire dangers within such fixed installations by providing apparatus which will substantially reduce the concentration of dust which normally prevails within storage spaces of such installations while the emptying of the packages is being accomplished.

Another object in general is to provide novel and improved apparatus for conveying pulverulent materials within fixed installations which when installed requires a minimum of material in the way of equipment and hence reduces installation cost and which will operate as efficiently and cheaply as possible.

These and other objects and advantages of my invention will more fully appear from the following description made in connection with the accompanying drawings wherein like reference characters refer to similar parts throughout the several views, and in which:

Fig. 1 is a somewhat diagrammatic perspective view of one embodiment of my invention with parts broken away to show the interior of one of the storage containers; and Fig. 2 is a fragmentary sectional view taken along approximately line 2—2 of Fig. 1.

One embodiment of my invention may include, as shown in Figs. 1–2, a plurality of medium sized storage containers or bins 5 mounted adjacent each other and connected together as shown to act as a unit. Each of these bins 5 has a top 6, a bottom 7, a front side 8 and a back side 9. These containers or bins 5 are preferably made of a light gauge metal such as 14 gauge stainless steel. All corners and edges of these containers 5 are rounded for sanitary purposes to insure against collection of the pulverulent material in cracks or crevices and consequent contamination of the material which passes through these containers. This is especially important to prevent vermin infestation of materials such as flour. Each of the containers 5 has a material inlet 10 which is connected to a common supply line 11 which in turn is fed from a portable unit (not shown) such as is disclosed in the above mentioned application. Each of the branch lines 12 which lead to the material inlet 10 is provided with a quick-closing valve 13. Each bin also is provided with a safety valve 14.

Each of the bins 5 is also provided with a compressed air inlet 15 which is connected in common to a compressed air supply line 16 as shown in Fig. 1 and having pressures of about zero to two pounds per square inch. A valve 17 is provided for each of these storage containers 5 so that the supply of compressed air may be made available to the storage containers selectively. A filter 18 which is comprised of fabricated material 19 stretched over a metal frame 20 is mounted on a sliding panel 21 which in turn is mounted upon a channel member 22 secured to the top 6. The top 6 is provided with an air outlet 23 adjacent the channel member 22 so that the panel 21 and the filter 18 may be slid to a position across the air outlet 23 or to a position beside the air outlet, leaving the latter open.

Each of the storage containers 5 is provided with a discharge outlet 24 adjacent the bottom 7 and with a gate member 25 extending across the discharge outlet 24 and activated by a crank 26 which functions to raise and lower the gate and thereby open and close the outlet 24. An agitator 27 is mounted adjacent the bottom of each of the storage containers 5 to agitate the container and the material adjacent its bottom so that the material will pass outwardly therefrom through the discharge outlet 24 when the agitator is operated and the interior of the container 5 is slightly pressurized.

Each of the discharge outlets 24 is connected as shown in common with a conveying conduit 28. One end portion 29 of this conduit 28 is connected to a source of compressed air (not shown) of pressures between about zero to five pounds per square inch to provide a flow of air through the conduit 28 toward an air lock indicated generally as 30. This air lock 30 has an air lock inlet 31 with which the conduit 28 communicates and which receives material therefrom. A filter 32 similar in construction but different in shape to the filter 18 is attached to the upper part of the air lock assembly. The conduits 28 feed the pulverulent material into the spaces 33 between the vanes 34 of the air lock 30 and these vanes in turn carry the material around and discharge the same through the discharge outlet 35 of the air lock in measured quantities and at a rate which is adjustable. As shown in Fig. 2, the air lock is driven by means of a motor 36 and belting 37 which passes around a drive pulley 38 which is mounted on the shaft 39 which carries the vanes 34 of the air lock.

The discharge outlet 35 of the air lock is connected to and communicates with a conduit 40 which serves as a delivery line to a garner bin 41 which in a bakery is ordinarily positioned above the baker's mixer and scale. As best shown in Fig. 1, the conduit 40 is arranged so that one of its end portions 42 is connected with a source of compressed air (not shown) which is capable of generating a pressure of between 5 and 30 pounds per square inch. Connection to this source of air pressure (not shown) creates an air flow in the direction indicated by the arrow through the conduit 40, adjacent the discharge outlet 35 and into the garner bin 41. It should be noted that the air flow passes directly beneath the air lock so that the material discharged therefrom will fall directly into the air flow which passes through the conduit 40 and up into the garner bin. It should also be noted that the air flow passes generally parallel to the length of the vanes 34 so that as the material drops through the discharge outlet this material is fluidized.

As in my previous application referred to above, this invention contemplates the use of the principle of what I prefer to call fluidized conveyance in contrast to pneumatic conveyance. In utilizing this principle, the pulverulent material is thoroughly mixed with sufficient air to enable the material to assume characteristics of a fluid such as water so that it will, of its own accord, attempt to seek a lower level through the action of gravity thereupon. Such thorough mixing alone, however, is insufficient to cause the fluidized material to rise to a higher elevation or to be moved a substantial distance horizontally without providing apparatus for maintaining the material in a fluidized state along its path of conveyance or without providing some other means of moving the material along. Devices employing air pressure for this purpose have previously utilized the principle of conveyance by pneumatic means in contrast to conveyance by fluidization. I have found, however, that by utilizing the principle of fluidization it is possible to move much greater quantities of the pulverulent materials within a given period of time while using the same sized conduit than if pneumatic means were utilized. To accomplish this I find that it is necessary to mix the pulverulent material with air so that it reaches a fluidized state and thereafter subject the material to a pressurized flow of air through a conduit which exceeds in pressure the pressure normally used in pneumatic conveyance. As disclosed in my previous application, dealing with portable conveying units, I find that I can move approximately 200 pounds of the material mixed with a single pound of air in contrast to pneumatic conveyance wherein only one pound of the material can be conveyed with one to three pounds of air. To accomplish this I utilize air pressures preferably within the range of 5 to 30 pounds or higher in contrast to the pressures used in pneumatic conveying of from 1 to 3 pounds per square inch. The rate of air flow when utilized with the fluidization principle is approximately 300 to 900 feet per minute in contrast to the much higher speed of flow in pneumatic conveying of between 2,000 to 5,000 feet per minute. One of the most important advantages I find in using the fluidization principle is that substantially less air must be used and very little air filtering is required while in pneumatic conveying, because of the large volume of air relative to the amount of material being moved, a great deal of dust is created and the filtering equipment required is quite extensive.

When such pulverulent materials are conveyed by fluidization and relatively high pressures, the entire cross-sectional interior of the conduit is filled with the material as it flows therethrough. This is in sharp contrast to conveyance by pneumatic means for in the latter case there is a very large volume of air with a little of the material interspersed therewithin. In other words, a very small volume of material relative to the volume of air used is conveyed by pneumatic means whereas the reverse is true when the conveyance is accomplished as disclosed and claimed herein. Accordingly, wherever in the claims hereinafter the term "conveying pulverulent materials by fluidization" is used, it is intended to connote the conveyance of such materials at relatively low velocities and high pressures as compared to pneumatic handling and to the transportaion of a much greater weight of such materials than the weight of the air utilized in such conveyancing so that the materials will flow out of the conveying tube much as water would flow therethrough. Therefore, when I use this term I am referring to the movement of such materials many times the weight of the amount of air utilized to effect such movement.

*Operation*

In operation, to commence the conveyance of the pulverulent material, the valves 17 are opened to pressurize slightly (zero to two pounds per square inch) the interior of the storage containers 5 and the conduits 28 and 40 are supplied with a flow of air therethrough by making their respective sources of compressed air available thereto. Thus, before any material leaves the storage containers 5 there is an air flow through the conduit 40 and into the garner bin 41. The motor 36 is also operated to cause the air lock 30 to operate. The filters 18 and 32 are made of sufficiently heavy fabric to retard the flow of air therethrough enough to maintain the slight pressure desired in the conduits 32 and within the containers 5. The gate 25 of the desired container 5 is then opened by operating the crank 26 and the agitator 27 is operated to agitate the material adjacent the bottom 7 of the container. This agitation will cause the material to flow into the conduit 28 whereupon it will become fluidized by the air flow and be carried into the air lock inlet 31 of the air lock 30. The air lock vanes 34 will carry the material downwardly through the air lock discharge outlet 35 and permit the same to drop into the conduit 40. The source of compressed air to which the conduit 40 is connected will quickly pressurize the interior of the conduit 40 and the flow of air through this conduit will immediately fluidize the pulverulent material dropping thereinto through the discharge outlet 35. In this manner the material will be fluidized and carried upwardly to the desired elevation and deposited into the interior of the garner bin 41, from which the material may be drawn for mixing and weighing as desired.

It can be readily seen that the pulverulent material may be drawn from whichever storage container 5 it is desired or it may be drawn from any combination of these containers at the desired rate provided those containers drawn from are on separate conduits 28. Thus, it is possible to accomplish mixing by drawing from more than one container or by drawing flours of two different types or grades if it is so desired.

When it is desired to stop the flow of the material into the garner bin 41, the gates 25 which have been previously opened are closed by means of their cranks 26 so that the flow of material into the conduit 28 is cut off. The motor 36 and the rotor 30 continue to operate, however, until the conduits 28 and 40 have been cleared of pulverulent material. Thereafter, the source of compressed air previously made available to the conduits 28 and 40 are cut off and the entire system is ready to commence operation whenever it is again needed.

One advantage of my invention is that the container bins 5 may be manufactured of such light weight material since only a very slight pressure is required within the containers 5. These containers 5 are substantially closed and hence such a pressure can be readily obtained. Since only a slight pressure of between 0 and 2 pounds per square inch is required the material from which the containers are manufactured may be of light weight and hence relatively cheap to manufacture.

It should be noted that I have accomplished that conveyance of a pulverulent material to a central location whereat I have mounted an air lock so that I have provided two conduits on opposite sides of the air lock, the conduit on the discharge side of the air lock being subjected to a pressure substantially higher than the pressure within the conduit which communicates with the inlet side of the air lock. Through the use of an air lock I have obviated the need for the pressurized chambers 5 to be manufactured of a relatively heavy material since it is not necessary for these containers to be subjected to the relatively higher pressures of between 5 and 20 pounds per square inch which are required to move such pulverulent material substantial elevations while in a fluidized state.

Through the use of a single delivery line I have also eliminated the need for pressurizing a large number of conduits to relatively high pressures and have thereby accomplished a substantial saving in power and equipment.

The invention disclosed and claimed herein is especially well-adapted for use within fixed installations such as bakeries. This equipment shown provides a means for conveying the flour to the garner bin with a minimum of dust and consequent fire danger and contamination as well as expense and accomplishes the same without any manual handling of the flour. At the same time, it accomplishes this rapidly and with equipment which may be manufactured at a minimum of cost since it is designed for construction of light weight material and has relatively few moving parts. Such moving parts as are employed are extremely simple and inexpensive and the entire unit can be installed at a very substantial saving over any previously known which employ the principle of pneumatic conveying.

Thus, it can be seen that I have provided novel and improved apparatus for conveying pulverulent materials such as flour within fixed installations such as bakeries which may be installed at a substantial saving in cost and which may be operated at increased efficiency and with a minimum of inconvenience and expense. It should be noted that this equipment eliminates all manual handling of the flour between the point of delivery and the point of use and thereby effects a substantial saving in man hours and in material because it is no longer necessary to carry the bags into the storage space, deposit them, and at a later date reconvey them to the point of use, open the bag, and empty the contents of the latter into the garner bin. With my equipment the entire cost of packaging of the material is saved as well as the cost of handling the material during the packaging process and thereafter. In addition, the loss of the actual material normally attendant with the handling of such material while in packages due to breakage of the package is completely eliminated. It should be noted that at the same time the possibility of contamination of the flour is reduced to an absolute minimum.

It should also be noted that perhaps the most important advantage of my equipment is that not only does it accomplish the job in a superior and novel manner but this accomplishment is made possible through the use of equipment which may be manufactured very cheaply and is simple and cheap to operate.

It will, of course, be understood that various changes may be made in the form, details, arrangement and proportions of the various parts without departing from the scope of my invention.

What I claim is:

1. Apparatus for conveying pulverulent material by fluidization within fixed installations such as bakeries and having in combination a substantially closed storage container having a bottom and a closable material inlet and having a material discharge outlet adjacent said bottom and having an air inlet connectable with a source of air pressure whereby the interior of said container may be slightly pressurized, means for agitating the material held by said container adjacent said outlet and causing the same to flow outwardly therethrough, closure mechanism adjacent said discharge outlet and controlling the flow of such material therethrough, pressurized conduit means connected to said discharge outlet and receiving therefrom and conducting an air flow from a point adjacent said discharge outlet away therefrom, a rotary air lock having an inlet connected to said condiut means and receiving such material therefrom and having an outlet, a second conduit means connected to said outlet of the air lock and receiving therefrom, means for delivering air under substantially constant pressure to said first conduit means, and means for delivering air under substantially constant pressure to said second conduit means longitudinally through said air lock, the last mentioned air delivery means delivering air under a substantially greater pressure than that delivered by the first mentioned air delivery means so that the stream of pulverulent material flowing through said second conduit means is characterized by having the ratio by weight of air to pulverulent material in the neighborhood of one lb. of air to 80–200 lbs. of pulverulent material.

2. Apparatus for conveying pulverulent material by fluidization within fixed installations such as bakeries and having in combination a substantially closed storage container having a bottom and a closable material inlet and having a material discharge outlet adjacent said bottom and having an air inlet connectable with a source of air pressure whereby the interior of said container may be slightly pressurized, means for agitating the material held by said container adjacent said outlet and causing the same to flow outwardly therethrough, closure mechanism adjacent said discharge outlet and controlling the flow of such material therethrough, pressurized conduit means connected to said discharge outlet and receiving therefrom and conducting an air flow from a point adjacent said discharge outlet away therefrom, a rotary air lock having an inlet connected to said conduit means and receiving such material therefrom and having an outlet, a second conduit means connected to said outlet of the air lock and receiving therefrom, means for delivering air under substantially constant pressure to said first conduit means, and means for delivering air under substantially constant pressure to said second conduit means longitudinally through said air lock, the last mentioned air delivery means delivering air under a substantially greater pressure than that delivered by the first mentioned air delivery means so that the stream of pulverulent material flowing through said second conduit means is characterized by having a bulk density approximately equal to the static bulk density of the pulverulent material in which the ratio by weight of air to pulverulent material is greater than about 35 lbs. of material to one pound of air.

3. Apparatus for conveying pulverulent material by fluidization within fixed installations such as bakeries and having in combination a substantially closed storage container having a bottom and a closable material inlet and having a material discharge outlet adjacent said bottom and having an air inlet connectable with a source of air pressure whereby the interior of said container may be slightly pressurized, means for agitating the material held by said container adjacent said outlet and causing the same to flow outwardly therethrough, closure mechanism adjacent said discharge outlet and controlling the flow of such material therethrough, pressurized conduit means connected to said discharge outlet and receiving therefrom and conducting an air flow from a point adjacent said discharge outlet away therefrom, a rotary air lock having an inlet connected to said conduit means and receiving such material therefrom and having an outlet, a second conduit means connected to said outlet of the air lock and receiving therefrom, means for delivering air under substantially constant pressure to said first conduit means, and means for delivering air under substantially constant pressure to said second conduit means longitudinally through said air lock, the last mentioned air delivery means delivering air under a substantially greater pressure than that delivered by the first mentioned air delivery means so that the stream of pulverulent material flowing through said second conduit means is characterized by having a bulk density approximately equal to the static bulk density of the pulverulent material.

References Cited in the file of this patent

UNITED STATES PATENTS

| Number | Name | Date |
|---|---|---|
| 1,240,409 | Black | Sept. 18, 1917 |
| 1,616,547 | Pontoppidan | Feb. 8, 1927 |
| 1,796,215 | Peikert | Mar. 10, 1931 |
| 1,889,163 | Vogel-Jorgensen | Nov. 29, 1932 |
| 1,898,356 | Fickey | Feb. 21, 1933 |
| 2,325,432 | Simpson | July 27, 1943 |
| 2,440,482 | Martin | Apr. 27, 1948 |
| 2,565,835 | Adams | Aug. 28, 1951 |
| 2,572,862 | Israel | Oct. 30, 1951 |
| 2,684,870 | Berg | July 27, 1954 |